United States Patent
Windgassen (10) Patent No.: US 8,943,919 B2
(45) Date of Patent: Feb. 3, 2015

(54) OVER SHAFT ROTARY ACTUATOR WITH INTERNAL CLAMP

(75) Inventor: William P. Windgassen, South Beloit, IL (US)

(73) Assignee: Schneider Electric Buildings, LLC, Loves Park, IL (US)

( * ) Notice: Subject to any disclaimer, the term of this patent is extended or adjusted under 35 U.S.C. 154(b) by 974 days.

(21) Appl. No.: 12/977,667

(22) Filed: Dec. 23, 2010

(65) Prior Publication Data

US 2012/0161562 A1 Jun. 28, 2012

(51) Int. Cl.
*H02K 7/116* (2006.01)
*B25G 3/00* (2006.01)
*F16B 9/00* (2006.01)
*F24F 13/14* (2006.01)

(52) U.S. Cl.
CPC ..... *F24F 13/1426* (2013.01); *F24F 2013/1446* (2013.01)
USPC ........................................ 74/421 A; 403/256

(58) Field of Classification Search
USPC ............ 74/421 A, 421 R, 451; 403/256, 263; 251/129.11, 248
See application file for complete search history.

(56) References Cited

U.S. PATENT DOCUMENTS

| | | | |
|---|---|---|---|
| 2,779,205 A * | 1/1957 | Black | 74/421 R |
| 2,966,811 A * | 1/1961 | Sundt | 475/178 |
| 3,595,505 A * | 7/1971 | Burwell et al. | 248/539 |
| 3,814,528 A * | 6/1974 | Duer | 403/256 |
| 5,458,148 A | 10/1995 | Zelczer et al. | |
| 5,544,970 A | 8/1996 | Studer | |
| 5,730,653 A | 3/1998 | Van Becelaere | |
| 5,810,662 A | 9/1998 | Van Becelaere | |
| 6,015,142 A | 1/2000 | Ulicny | |
| 6,059,318 A | 5/2000 | Estep et al. | |
| 6,105,927 A | 8/2000 | Zelczer et al. | |
| 6,495,981 B2 | 12/2002 | Romanowich et al. | |
| 6,505,991 B2 | 1/2003 | Roman | |
| 7,025,328 B2 | 4/2006 | Ulicny et al. | |
| 7,069,803 B2 * | 7/2006 | Schunke et al. | 74/421 R |
| 7,191,678 B2 * | 3/2007 | Schunke et al. | 74/421 A |
| 2002/0030172 A1 | 3/2002 | Twito | |
| 2005/0287947 A1 | 12/2005 | Ulicny et al. | |
| 2006/0067820 A1 | 3/2006 | Wang et al. | |
| 2006/0073018 A1 | 4/2006 | Girod et al. | |
| 2006/0182535 A1 | 8/2006 | Rice et al. | |
| 2006/0182536 A1 | 8/2006 | Rice et al. | |

(Continued)

FOREIGN PATENT DOCUMENTS

| JP | 2003322395 A | 11/2003 |
|---|---|---|
| WO | WO 83/00368 A1 | 2/1983 |
| WO | WO 2006/088286 A1 | 8/2006 |

OTHER PUBLICATIONS

Belimo; "Damper Actuator GM24A-MF"; technical data sheet; May 2008; pp. 1-5 and 1/2 to 2/2.

*Primary Examiner* — Justin Krause
(74) *Attorney, Agent, or Firm* — Reinhart Boerner Van Deuren P.C.

(57) ABSTRACT

An over shaft rotary actuator with an internal clamp arrangement is provided. The actuator includes an internal clamp arrangement carried within a housing. A drive train and a motor also carried within the housing and mechanically coupled to the internal clamp arrangement. The internal clamp arrangement is centered on the plane that a driving torque is applied to the internal clamp arrangement to rotate a shaft.

18 Claims, 9 Drawing Sheets

(56) References Cited

U.S. PATENT DOCUMENTS

2006/0218951 A1 10/2006 Pearson et al.
2007/0147976 A1 6/2007 Rice et al.
2007/0147979 A1 6/2007 Rice et al.
2007/0147982 A1 6/2007 Rice et al.
2009/0052982 A1 2/2009 Bakken et al.

* cited by examiner

OVER SHAFT ROTARY ACTUATOR WITH INTERNAL CLAMP

FIELD OF THE INVENTION

This invention generally relates to mechanical actuation devices, and more particularly to damper actuators for rotating a shaft.

BACKGROUND OF THE INVENTION

Heating, ventilation, and air conditioning (HVAC) systems typically employ a network of ducts throughout a home or building to move temperature controlled air in an effort to maintain a set temperature. Certain contemporary systems can also employ one or more dampers positioned at various locations within the ducts to govern the flow of air therethrough.

Conventional dampers are typically employed in multizone HVAC systems to facilitate the independent temperature control of each zone. A typical damper acts generally like a valve member within the duct in that it selectively restricts the flow of air through the duct. The above dampers can be manually or mechanically actuated. In either case, the damper is rotatable about a shaft to change an angular orientation of the damper within the duct to ultimately increase or reduce a flow restriction.

In the case of mechanically actuated dampers, a damper actuator is typically mounted to the shaft of the damper to rotate the damper to various angular orientations. The shaft of the damper extends through an exterior of the duct. The damper actuator mounts to the shaft at the exterior of the duct.

Conventional damper actuators typically include a housing that carries a motor and a gear train mechanically coupling the motor to a rotatable clamp. The motor and gear train are located within the housing. The clamp is coupled to the gear train within the housing, but the portion of the clamp used to connect the actuator to the damper shaft is located outside of the housing.

Unfortunately, clamping the damper shaft at the exterior of the housing of the actuator creates several problems. First, the input torque supplied by the motor via the gear train is applied to the clamp inside the housing. However, the clamp is fixedly connected to the shaft outside the housing. As a result, the portion of the clamp that connects to the shaft is not in the same plane as the portion of the clamp where the input torque is applied. This out of plane configuration creates a reaction force that causes the actuator to rock or oscillate in a direction generally parallel to the axis of rotation of the shaft.

Second, locating the clamp outside of the actuator creates a safety risk. A typical clamp is generally not regular in shape, and the clamp may entangle the lead wires of the actuator or other items in proximity to the clamp. As such, there is a need in the art for an actuator that provides a more balanced loading and reduces the risks of entanglement of prior designs.

The invention provides such an actuator. These and other advantages of the invention, as well as additional inventive features, will be apparent from the description of the invention provided herein.

BRIEF SUMMARY OF THE INVENTION

In one embodiment, the invention provides an actuator having an internal clamping arrangement. An actuator according to this embodiment includes a housing and a motor carried within the housing. A clamp arrangement is carried within the housing, and is operable to apply a clamping force to a shaft. A drive train is also carried within the housing and mechanically couples the motor to the clamp arrangement to rotate the clamp arrangement.

In another embodiment, the housing includes a removable access cover configured to provide access to the internal clamp arrangement. In another embodiment, the internal clamp arrangement includes a clamp for clamping the internal clamp arrangement to a shaft internally within the housing. The internal clamp arrangement also includes a geared portion for mechanically coupling the internal clamp arrangement to the drive train. In another embodiment, the clamp includes a clamping bracket and a clamping bar, the clamping bracket adjustable relative to the clamping bar to define an opening for receipt of a shaft.

In another embodiment, the internal clamp arrangement includes a clamp driving bracket having an opening, a portion of the clamp disposed within the opening, the clamp driving bracket providing the geared portion. In another embodiment, the internal clamp arrangement includes a casing member including a pair of casing member halves, the casing member halves enclosing the clamping bracket, the clamping bar, and a portion of the clamp driving bracket. In another embodiment, the geared portion of the clamp driving bracket extends from the casing member to contact the drive train.

In another embodiment, the internal clamp arrangement includes a U-shaped clamp and a casing member, with the U-shaped clamp internally carried within the casing member. In another embodiment, the casing member includes a casing member body and a casing member cover, the U-shaped clamp adjustable relative to the casing member body and the casing member cover by at least one adjustment nut externally accessible from the casing member.

In another embodiment, the U-shaped clamp defines and opening and the casing member body and casing member cover each include an aperture aligned with the opening of the U-shaped clamp. In another embodiment, at least one of the apertures of the casing member body and casing member cover includes a serrated portion, the U-shaped clamp configured to bias a shaft into engagement with the U-shaped clamp and the serrated portion. In another embodiment, the casing member body includes the geared portion formed on an outer periphery of the casing member body.

In another embodiment, the geared portion is formed on a casing member of the internal clamp arrangement, the clamp adjustable relative to the casing member. In another embodiment, the clamp includes an aperture, and the casing member includes an aperture, the clamp adjustable relative to the casing member such that the aperture of clamp is misaligned with the aperture of the casing member to define a resultant shaft opening. In another embodiment, the aperture of the clamp includes a clamping surface, and the aperture of the casing member includes a clamping surface, the clamping surfaces operable to exert a clamping force upon a shaft upon misalignment of the aperture of the clamp and the aperture of the casing member.

In another embodiment, a rotary actuator is provided. A rotary actuator according to this embodiment includes a housing and a clamp assembly rotably mounted to the housing. The clamp assembly is operable to apply a clamping force to a shaft. The clamp assembly includes a first bearing for rotably supporting the clamp arrangement relative to housing and a second bearing for rotably supporting the clamp arrangement relative to housing. The clamp assembly also includes a gear member interposed between the first and second bearings.

In another embodiment, the clamp assembly includes a pair of casing member halves, the casing member halves providing the first and second bearings, the casing member halves attached to the gear member such that rotation of the gear member about a shaft axis rotates the casing members. In another embodiment, the first and second bearings define apertures that are coaxial about the shaft axis, the apertures for receiving the shaft therethrough along the shaft axis. In another embodiment, the clamp assembly includes a clamp for applying the clamping force to the shaft, the clamp and the gear member positioned at a same axial position along the shaft axis. In another embodiment, the casing member halves fix the position of the gear member relative to the clamp.

In another embodiment, the clamp assembly includes a pair of casing member halves that define the first and second bearings, the first and second bearings being coaxial about a rotational axis, the clamp assembly further includes a clamp including an opening aligned with the first and second bearings such that a shaft is able to be received through the opening and the first and second bearings generally along the rotational axis.

In another embodiment, the gear member is fixed to the casing member halves such that an input torque applied to the gear member rotates the casing member halves about the rotational axis relative to the housing. In another embodiment, the clamp and the gear member axially positioned between the first and second bearings along the rotational axis. In another embodiment, the clamp and the gear member axially aligned at substantially a same position along the rotational axis.

In another embodiment, the first and second bearings are annular projections extending axially outward and away from one another.

In another embodiment, a method of installing a rotary actuator to a shaft to be actuated by the rotary actuator is provided. The method includes passing the shaft through an aperture in the rotary actuator and clamping a gear member to the shaft using a clamp housed entirely within the rotary actuator. In another embodiment, the method further includes the step of installing a cover portion onto a housing portion of the rotary actuator so that the clamp is housed entirely within the rotary actuator.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
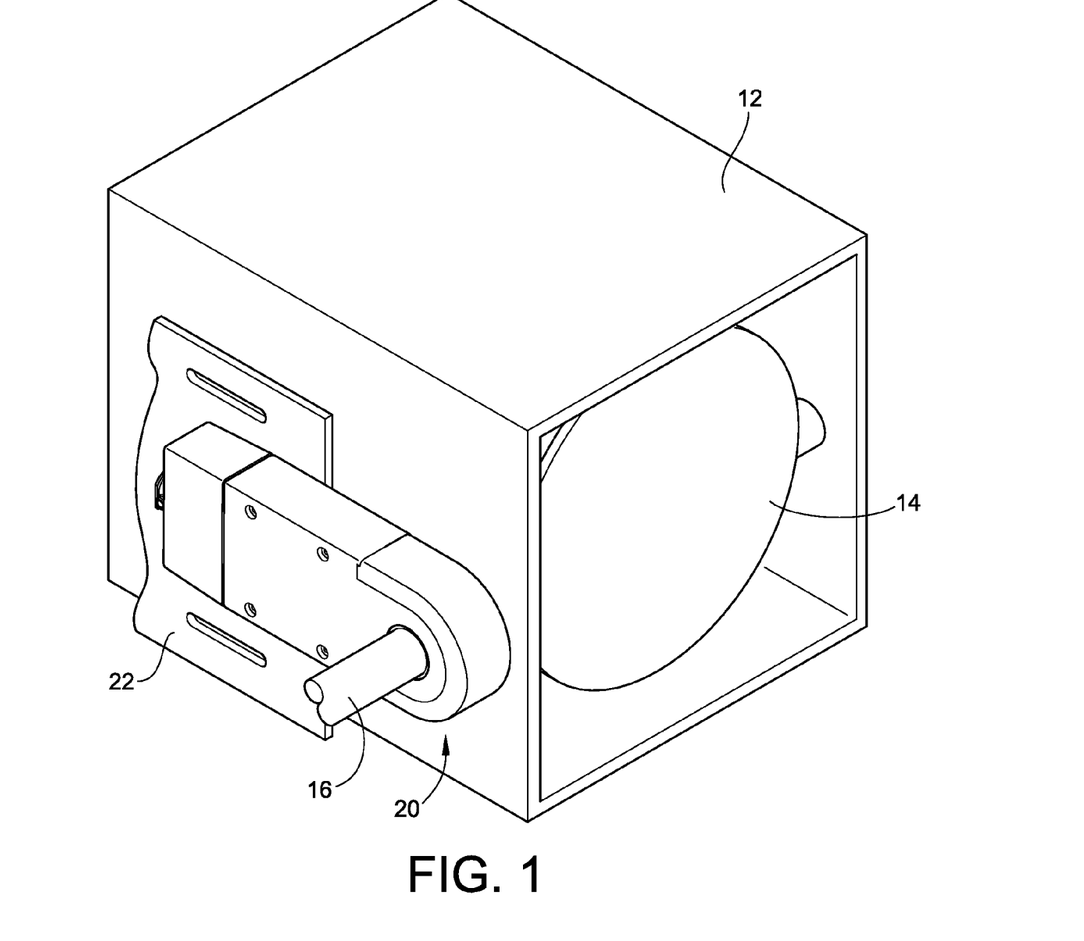
FIG. 1 is an exemplary embodiment of an over shaft rotary actuator with an internal clamp arrangement according to the teachings of the present invention mounted on a typical damper assembly.

Turning now to the drawings, there is illustrated at FIG. 1 an exemplary embodiment of a duct 12 carrying a damper 14. A shaft 16 of the damper 14 extends through the duct 12. An embodiment of an actuator 20 according to the teachings of the present invention is mounted to a mounting structure 22 and connected to the shaft 16 of the damper 14. The actuator 20 is operable to rotate the shaft 16 to ultimately govern the position of the damper 14 within the duct 12. Although such an exemplary embodiment will be used in discussing the various advantages of embodiments of the present invention, it will be recognized that the actuator 20 can be incorporated into various other systems, e.g. fluid flow applications, or other application wherein it is desirable to rotate a shaft.

Figure 2:
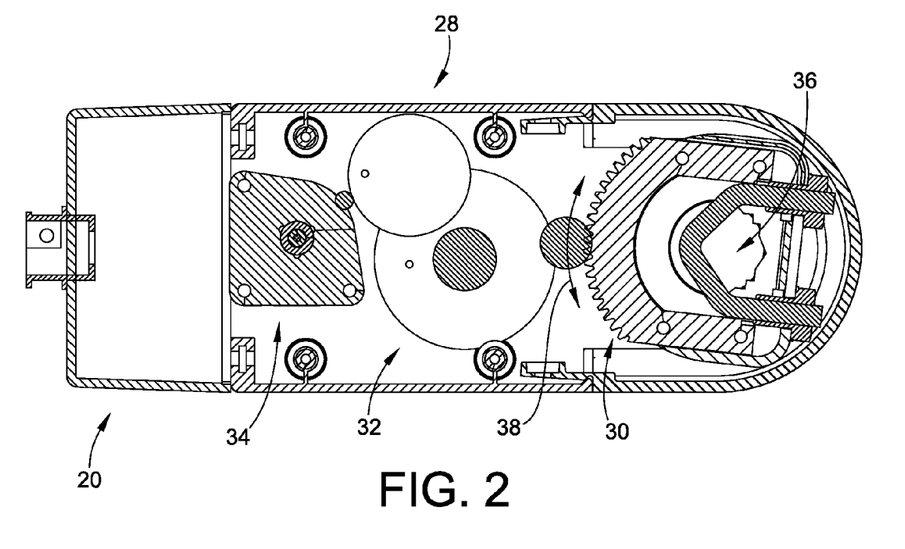
FIG. 2 is a cross-section of the actuator of FIG. 1.

Turning now to FIG. 2, the actuator 20 includes a housing 28 carrying an internal clamp arrangement 30 that is mechanically coupled via a drive train 32 to a motor 34, also carried with the housing 28. The housing 28 includes a shaft aperture 36 that is proximate to the internal clamp arrangement 30. The shaft aperture 36 is positioned to receive a shaft, such as the shaft 16 illustrated at FIG. 1, such that the internal clamp arrangement 30 can apply a clamping force thereto. As will be discussed in greater detail in the following, the internal clamp arrangement 30 is operable to transmit a driving torque supplied from the motor 34 through the drive train 32 to ultimately rotate the shaft 16 (see FIG. 1) generally in direction 38 as illustrated. The actuator 20 overcomes existing problems in prior designs by packaging a clamp and/or clamp assembly of the internal clamp arrangement 30 entirely within the housing 28.

Still referring to FIG. 2, the drive train 32 and motor 34 can take a variety of forms. Indeed, it will be recognized that the particular configuration of the drive train 32 will be largely dependent upon the designed gear ratio of the actuator 20. As the gear ratio will vary from application to application, it will be recognized that various drive train 32 configurations can be utilized. Further, various types and sizes of motors 34 can also be incorporated into the actuator 20, their selection depending largely upon the particular application that the actuator 20 will operate in. As such, embodiments of the invention are not limited to the particular drive train 32 or motor 34 illustrated throughout the figures and discussed herein.

Figure 3:
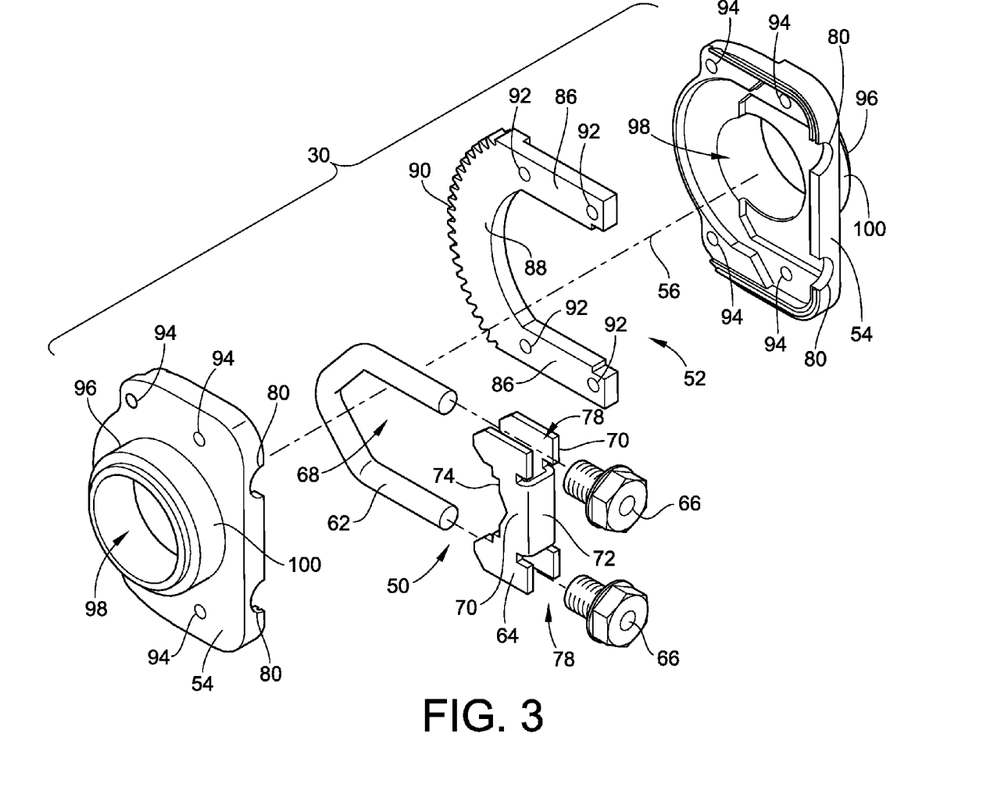
FIG. 3 is an exploded view of an internal clamp arrangement of the actuator of FIG. 1.

Turning now to FIG. 3, an assembly view of one embodiment of an internal clamp arrangement 30 is illustrated. The internal clamp arrangement 30 includes a clamp 50 and a clamp driving bracket 52 mounted to and carried by a casing member having a pair of symmetric casing member halves 54. As will be discussed in greater detail below, the clamp 50, clamp driving bracket 52, and casing member halves 54 are generally aligned about an axis 56. When the internal clamp assembly 30 is installed within the housing 28 (see FIG. 1), the axis 56 is generally centered on the shaft aperture 36 (see FIG. 1) thereof.

The clamp 50 includes a clamping bracket 62 and a clamping bar 64. The clamping bracket 62 is adjustable relative to the clamping bar 64 via adjustment nuts 66. As such, the clamp 50 can accommodate shafts of various outer diameters.

The clamping bracket 62 is generally U-shaped. The clamping bracket can be formed from a variety of materials including but not limited to plastics, metals, and/or composite materials. The U-shaped clamping bracket 62 also defines an opening 68 for receipt of a shaft such as that illustrated at FIG. 1. The opening is sized such that it can receive a shaft on or off center with axis 56.

The clamping bar 64 includes a pair of sidewalls 70 extending upward from a bottom wall 72. Each sidewall 70 includes a serrated portion 74. The sidewalls 70 are spaced apart such that the clamping bracket 62 may slide therebetween and through openings 78 adjacent to the bottom wall 72. The adjustment nuts 66 are also positioned between the sidewalls 70 such that the position of the clamping bracket 62 is adjustable relative to the clamping bar 64 to accommodate different sizes of shafts. The adjustment nuts 66 are accessible from an exterior of the casing member halves 54 through openings 80 formed therein. The clamping bar can be made of various materials, e.g. plastics, metals, and/or composite materials.

More specifically, the clamping bracket 62 is adjustable relative to the clamping bar 64 such that the clamping bracket 62 forces the outer periphery of a shaft into engagement with the serrated portion 74 of each of the sidewalls 70. Such engagement presents a clamp force sufficient enough that rotation of the clamp 50 results in rotation of the shaft 16 (see FIG. 1).

The clamp driving bracket 52 includes a pair of mounting extensions 86 with an arcuate section 88 therebetween. The arcuate section 88 includes a gear profile 90 formed thereon. Each mounting extension 86 includes mounting holes 92 that are alignable with mounting holes 94 of the casing member halves 54. When assembled, the arcuate portion 88 and more particularly the geared profile 90 extend outward from the casing member halves 54. Such a configuration permits mechanical communication between the drive train 32 (see FIG. 2) and the internal clamp assembly 30. As illustrated, the clamp driving bracket 52 generally surrounds the clamp 50 such that the mounting extensions 86 are disposed on either side of the clamp 50.

Each casing member halve 54 includes a bearing in the form of an annular projection 96. The annular projections 96 are received in the shaft apertures 36 of the housing 28 (see FIG. 1). The annular projections 96 are rotatable within the shaft apertures 36 and generally provide a rotational bearing surface 100 for the smooth rotation of the internal clamp assembly 30 relative to the housing 28 (see FIG. 1). It will be recognized that in such a configuration, the clamp 50 is supported by bearings in the form of annular projections 96, on either side thereof such that the clamp 50 is positioned between the annular projections 96.

Figure 4:
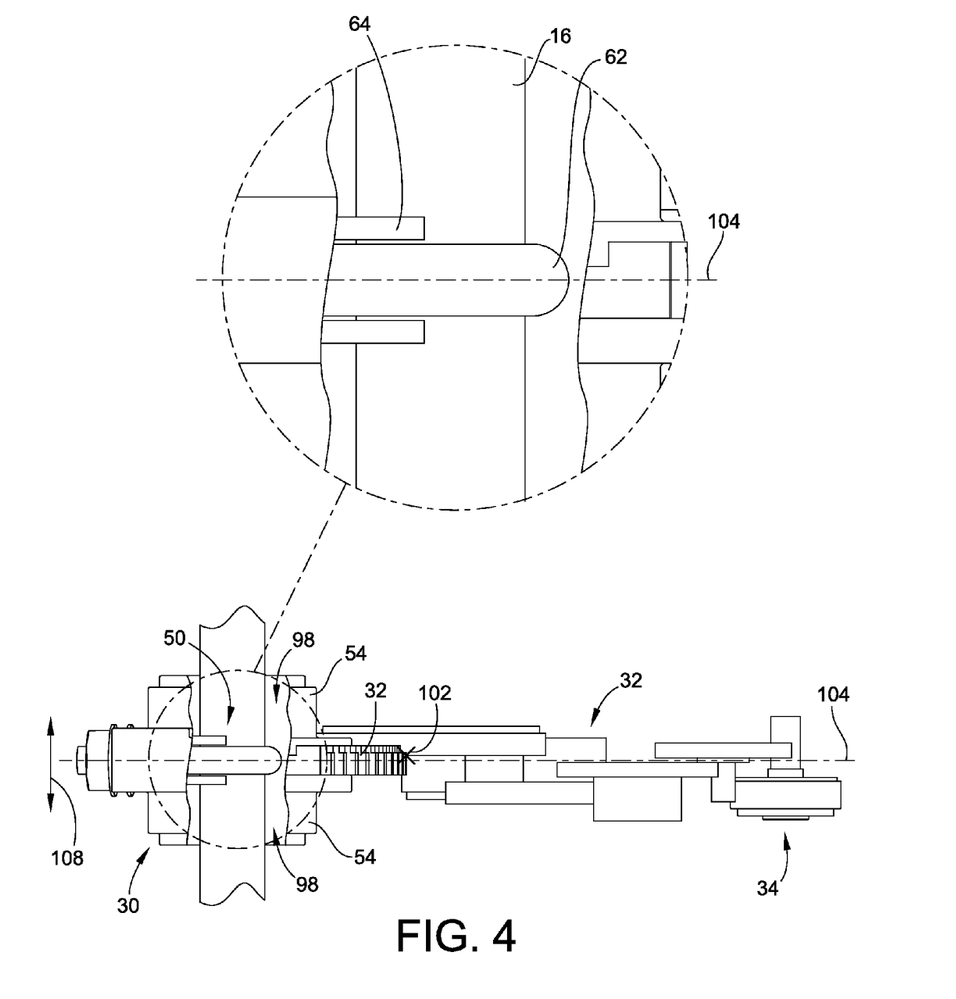
FIG. 4 is a top view of the internal clamp arrangement, a drive train, and a motor of the actuator of FIG. 1.

Turning now to FIG. 4, the clamp 50 and clamp driving bracket 52 are generally aligned. More specifically, a mesh point 102 of the clamp driving bracket 52 and drive train 32 is located in a plane 104 passing generally through the center of the clamp 50. Such an arrangement overcomes prior designs by locating the clamp 50 in the same plane as the plane 104 in which the driving torque is applied to the internal clamp arrangement 30. The result is a more balanced loading on the actuator 20. More specifically, the bending moment of the internal clamp arrangement 30 is substantially reduced, thereby mitigating the tendency for the actuator to rock or osculate along axis 108.

Figure 5:
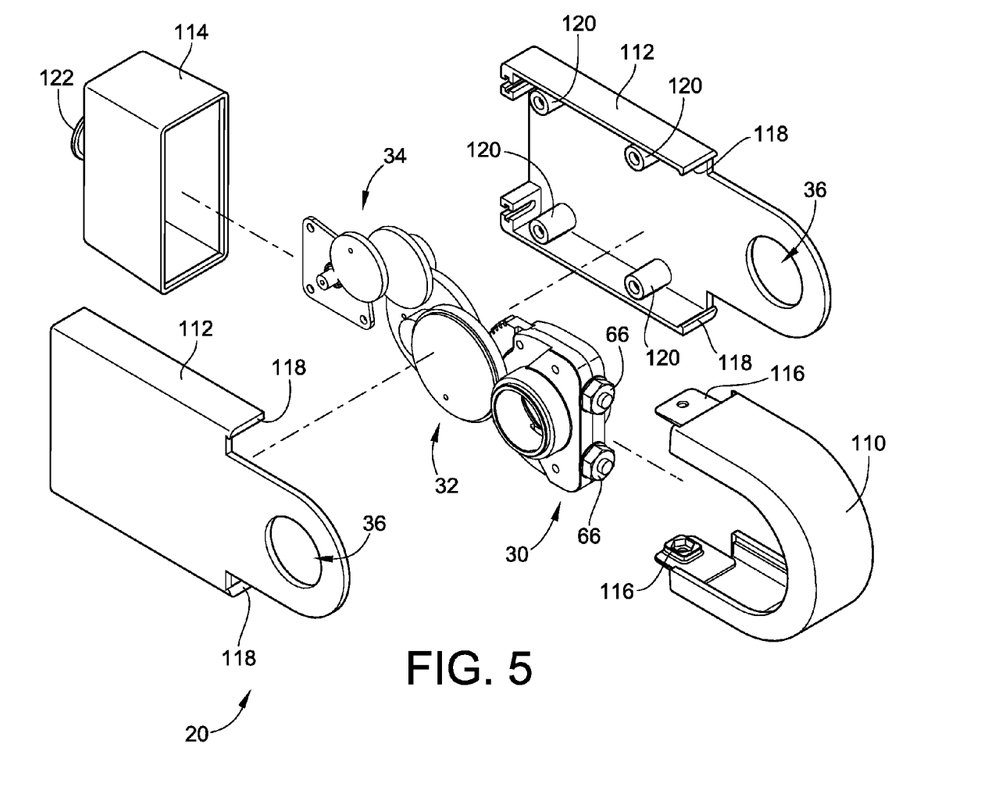
FIG. 5 is an exploded view of a housing of the actuator of FIG. 1.

Turning now to FIG. 5, the housing 28 encloses the internal clamp arrangement 30, drive train 32, and motor 34 in a compact package. The housing 28 includes a clamp access cover 110, a pair of side enclosures 112, and a wiring cover 114. The clamp access cover 110 is generally U-shaped and includes a pair of locking tabs 116 that cooperate with locking detents 118 of the side enclosures 112. The locking tabs 116 and locking detents 118 provide a snap connection between the clamp access cover 110 and side enclosures 112. When fully assembled, this snap connection allows a user to quickly remove the clamp access cover 110 to make adjustments to the internal clamp arrangement 30, and more particularly to the adjustment nuts 66 thereof.

Each side enclosure 112 includes a plurality of mounting structures 120 used to fit the side enclosures 112 to one another. Generally, the side enclosures 112 protect the inner workings of the actuator 20, and more specifically the internal clamp arrangement 30, drive train 32, and motor 34.

The wiring cover 114 connects to the side enclosures 112 at an opposite end thereof from the clamp access cover 110. The wiring cover 114 is also removable from the remainder of the actuator 20 via a snap connection. The wiring cover 114 includes a conduit lug 122 to route electrical wires to the motor 34.

Figure 6:
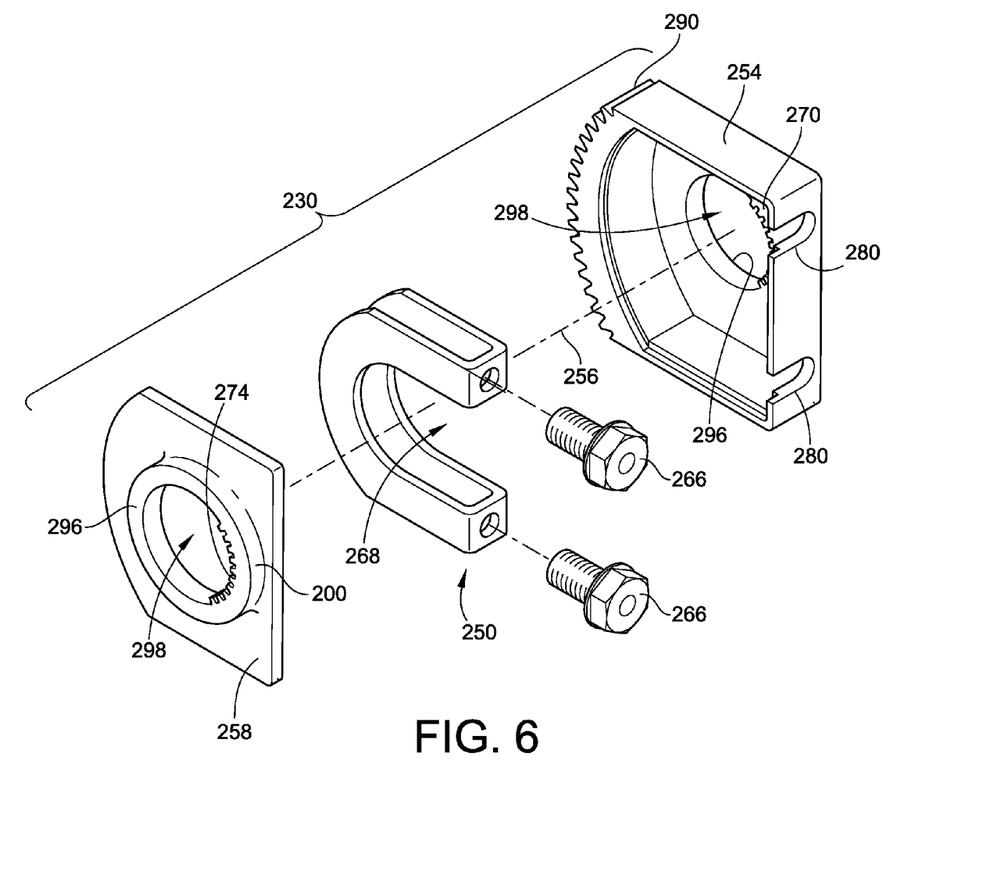
FIG. 6 is an exploded view of a second embodiment of an internal clamp arrangement.

Turning now to FIG. 6, an alternative embodiment of an internal clamp arrangement 230 is illustrated. In this embodiment, the internal clamp arrangement 230 has a reduced number of components then that of the embodiment of the internal clamp arrangement 30 discussed relative to FIGS. 1-5. The internal clamp arrangement 230 of FIG. 6 includes a clamp 250 carried internally by a casing member including a casing member body 254 and a casing member cover 258. The clamp 250 is generally U-shaped and defines an opening 268 therethrough. The opening 268 is sized to receive a shaft such as the shaft 16 illustrated in FIG. 1.

The clamp 250 is adjustable relative to the casing member via adjustment nuts 266. The adjustment nuts 266 pass through slots 280 formed in the casing member body 254.

The casing member body 254 and casing member cover 258 each include a serrated portion 274 formed on an inner diameter of apertures 298 formed in each of the casing member body 254 in casing member cover 258. The opening 268 of the clamp 250 and apertures 298 of the casing member body 254 and casing member cover 258 are alignable about an axis 256. The clamp 250 is adjustable about the axis 256 such that the clamp 250 can bias a shaft passing through the internal clamp arrangement 230 into one or both of the serrated portions 274 of the casing member body 254 and casing member cutter 258. Such a configuration will provide sufficient clamping force to a shaft to rotate the same upon an input to the internal clamp arrangement 230.

The internal clamp arrangement 230 also includes bearings in the form of annular projections 296 providing bearing surfaces 200. In a similar manner as described above, the annular projections 296 are supported by apertures of an actuator housing (e.g. shaft apertures 36 of FIG. 5) such that the clamp 250 is supported on both sides thereof and positioned between the annular projections 296.

It will be recognized that the internal clamp arrangement 230 eliminates the need for a clamp driving bracket 52 and a clamping bar 64 as described above at FIGS. 1-5. More specifically, the casing member body 254 incorporates the geared portion 290 that would otherwise be provided via a clamp driving bracket 52 (see FIG. 3). Similarly, the serrated portions 274 of the casing member body 254 and casing member cover 258 eliminate the need for a clamping bar 64 (see FIG. 3).

Figure 7:
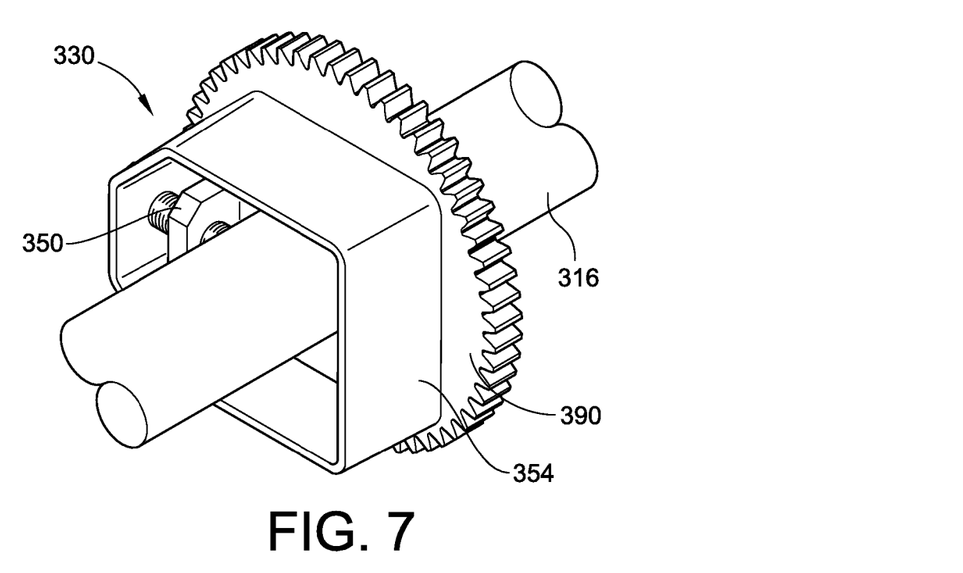
FIG. 7 is a perspective view of a third embodiment of an internal clamp arrangement.

Turning now to FIG. 7, another embodiment of an internal clamp arrangement 330 is illustrated. A section of a shaft 316 is illustrated passing through the internal clamp arrangement for orientation purposes. The internal clamp arrangement 330 includes a casing member in the form of a casing gear 354 having a geared portion 390 formed integrally therewith. The internal clamp arrangement 330 also includes a clamp 350 that is adjustable relative to the casing gear 354 as described below.

Figure 8:
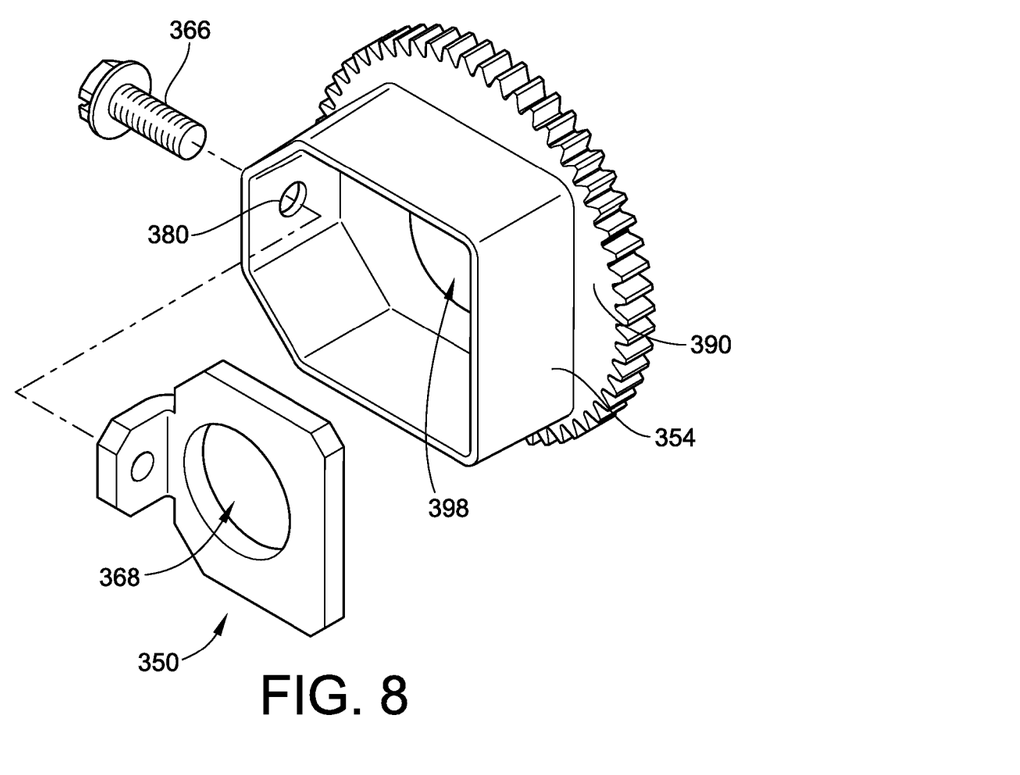
FIG. 8 is an exploded view of the third embodiment of the internal clamp arrangement of FIG. 7.

Turning now to FIG. 8, the internal clamp arrangement 330 is adjustable to accommodate different sizes of shafts in a similar manner as that described above. More specifically, the clamp 350 is adjustable relative to the casing gear 354 via an adjustment nut 366. The adjustment nut passes through an aperture 380 of the casing member 354 to adjust the position of an aperture 368 passing through the clamp 350 relative to an aperture 398 of the casing gear 354. This relative movement between these components misaligns apertures 368, 398, and increases or decreases the result in size of a shaft passage 382 illustrated at FIG. 9. The shaft passage 382 represents the outer diameter of a shaft passing through the internal clamp arrangement 330.

Figure 9:
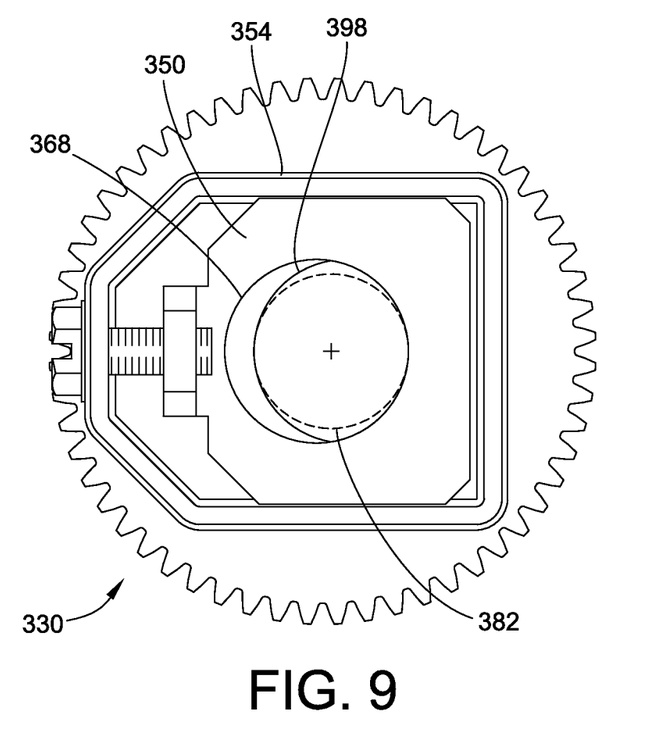
FIG. 9 is a side view of the third embodiment of the internal clamp arrangement of FIG. 7.

As illustrated in FIG. 9, the clamping force of the internal clamp arrangement 330 is thus provided by the aperture 368 of the clamp 350 and the aperture 398 of the casing gear 354. It will be recognized that the internal clamp arrangement 330 illustrated in FIGS. 7-9 does not utilize a serrated portion 74 as illustrated in FIG. 3, or a serrated portion 274 as illustrated at FIG. 6.

Figure 10:
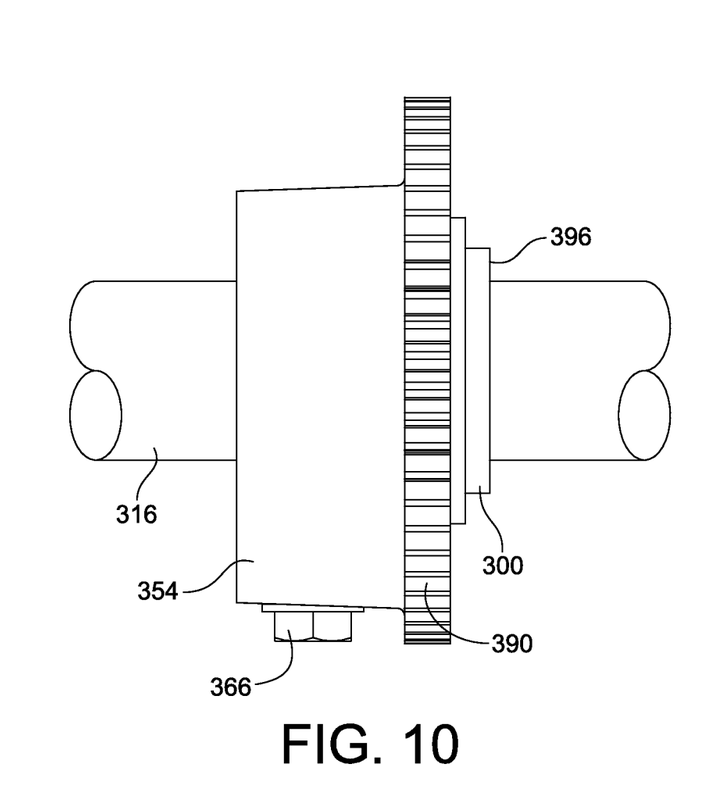
FIG. 10 is a top view of the third embodiment of the internal clamp arrangement of FIG. 7.

Turning now to FIG. 10, the internal clamp arrangement 330 also includes a bearing in the form of an annular projection 396 on the casing gear 354. The annular projection 396 provides a bearing surface 300 to facilitate rotation of the internal clamp arrangement 330 relative to a housing in a similar manner as described above.

As described herein, embodiment of the valve actuator 20 provide a new and improved actuator that includes an internal clamp arrangement 30, 230, 330 that is generally centered on the same plane as the driving torque that is applied to the internal clamp arrangement 30, 230, 330. Such a configuration reduces the overall bending moment upon the internal clamp arrangement 30, 230, 330 and also reduces tendency in actuator 20 incorporating the same to rock or osculate during operation. Further, the internal clamp arrangement 30, 230, 330 provides for a compact and safer mechanism as all moving parts are contained within a housing 28.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A rotary actuator comprising:
   a housing;
   a motor carried within the housing;
   a clamp arrangement carried within the housing, the clamp arrangement operable to apply a clamping force to a shaft; and
   a drive train carried within the housing and mechanically coupling the motor to the clamp arrangement to rotate the clamp arrangement, the clamp arrangement including:
      a first bearing for rotatably supporting the clamp arrangement relative to the housing;
      a second bearing for rotatably supporting the clamp arrangement relative to the housing;
      a gear portion interposed between the first and second bearings; and
   wherein the clamp arrangement includes a pair of casing member halves, the casing member halves providing the first and second bearings, the casing member halves attached to the gear portion such that rotation of the gear portion about a shaft axis rotates the casing member.

2. The rotary actuator of claim 1, wherein the housing includes a removable access cover configured to provide access to the internal clamp arrangement.

3. The rotary actuator of claim 1, wherein the internal clamp arrangement includes a clamp for clamping the internal clamp arrangement to a shaft internally within the housing, and wherein the internal clamp arrangement includes the gear portion for mechanically coupling the internal clamp arrangement to the drive train.

4. The rotary actuator of claim 3, wherein the clamp includes a clamping bracket and a clamping bar, the clamping bracket adjustable relative to the clamping bar to define an opening for receipt of the shaft.

5. The rotary actuator of claim 4, wherein the internal clamp arrangement includes a clamp driving bracket having an opening, a portion of the clamp disposed within the opening, the clamp driving bracket providing the gear portion.

6. The rotary actuator of claim 5, wherein the casing member halves enclose the clamping bracket, the clamping bar, and a portion of the clamp driving bracket.

7. The rotary actuator of claim 6, wherein the gear portion of the clamp driving bracket extends from the casing member to contact the drive train.

8. The rotary actuator of claim 3, wherein the internal clamp arrangement includes a U-shaped clamp and a casing member, the U-shaped clamp internally carried within the casing member.

9. The rotary actuator of claim 8, wherein the casing member includes a casing member body and a casing member cover, the U-shaped clamp adjustable relative to the casing member body and the casing member cover by at least one adjustment nut externally accessible from the casing member.

10. The rotary actuator of claim 9, wherein the U-shaped clamp defines an opening and the casing member body and casing member cover each include an aperture aligned with the opening of the U-shaped clamp.

11. A rotary actuator comprising:
a housing
a clamp assembly rotably mounted to the housing, the clamp assembly operable to apply a clamping force to a shaft, the clamp assembly including:
a first bearing for rotatably supporting the clamp arrangement relative to the housing;
a second bearing for rotatably supporting the clamp arrangement relative to the housing;
a gear member interposed between the first and second bearings,
wherein the clamp assembly includes a pair of casing member halves, the casing member halves providing the first and second bearings, the casing member halves attached to the gear member such that rotation of the gear member about a shaft axis rotates the casing members.

12. The rotary actuator of claim 11, wherein the first and second bearings define apertures that are coaxial about the shaft axis, the apertures for receiving the shaft therethrough along the shaft axis.

13. The rotary actuator of claim 12, further comprising a clamp for applying the clamping force to the shaft, the clamp and the gear member positioned at a same axial position along the shaft axis.

14. The rotary actuator of claim 13, wherein the casing member halves fix the position of the gear member relative to the clamp.

15. A rotary actuator comprising:
a housing
a clamp assembly rotably mounted to the housing, the clamp assembly operable to apply a clamping force to a shaft, the clamp assembly including:
a first bearing for rotatably supporting the clamp arrangement relative to the housing;
a second bearing for rotatably supporting the clamp arrangement relative to the housing;
a gear member interposed between the first and second bearings,
wherein the clamp assembly includes a pair of casing member halves that define the first and second bearings, the first and second bearings being coaxial about a rotational axis, the clamp assembly further includes a clamp including an opening aligned with the first and second bearings such that a shaft is able to be received through the opening and the first and second bearings generally along the rotational axis.

16. The rotary actuator of claim 15, wherein the gear member is fixed to the casing member halves such that an input torque applied to the gear member rotates the casing member halves about the rotational axis relative to the housing.

17. The rotary actuator of claim 16, wherein the clamp and the gear member are axially positioned between the first and second bearings along the rotational axis.

18. The rotary actuator of claim 17, wherein the clamp and the gear member are axially aligned at substantially a same position along the rotational axis.

* * * * *